(12) United States Patent
Fujimaki

(10) Patent No.: US 9,906,781 B2
(45) Date of Patent: Feb. 27, 2018

(54) HEAD MOUNTED DISPLAY DEVICE AND CONTROL METHOD FOR HEAD MOUNTED DISPLAY DEVICE

(71) Applicant: SEIKO EPSON CORPORATION, Tokyo (JP)

(72) Inventor: Yutaka Fujimaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 93 days.

(21) Appl. No.: 14/914,149

(22) PCT Filed: Sep. 8, 2014

(86) PCT No.: PCT/JP2014/004606
§ 371 (c)(1),
(2) Date: Feb. 24, 2016

(87) PCT Pub. No.: WO2015/037219
PCT Pub. Date: Mar. 19, 2015

(65) Prior Publication Data
US 2016/0219272 A1  Jul. 28, 2016

(30) Foreign Application Priority Data

Sep. 13, 2013 (JP) ................................ 2013-190061

(51) Int. Cl.
*H04N 13/04* (2006.01)
(52) U.S. Cl.
CPC ....... *H04N 13/0497* (2013.01); *H04N 13/044* (2013.01); *H04N 13/0484* (2013.01)
(58) Field of Classification Search
None
See application file for complete search history.

(56) References Cited

U.S. PATENT DOCUMENTS

2002/0024675 A1* 2/2002 Foxlin .................. G02B 27/017
356/620
2002/0075286 A1  6/2002 Yonezawa et al.
(Continued)

FOREIGN PATENT DOCUMENTS

| GB | 2 298 501 A | 9/1996 |
| JP | 2011-059435 A | 3/2011 |
| WO | 03/034705 A2 | 4/2003 |

OTHER PUBLICATIONS

Nov. 19, 2014 Search Report issued in International Patent Application No. PCT/JP2014/004606.
(Continued)

*Primary Examiner* — Kevin McInnish
(74) *Attorney, Agent, or Firm* — Oliff PLC

(57) ABSTRACT

A head mounted display device includes an image display unit including an image-light generating unit configured to generate image light on the basis of image data and emit the image light, the image display unit causing, in a state in which the image display unit is worn on the head of a user, the user to visually recognize the image light as a virtual image and transmitting an outside scene, a detecting unit configured to detect the movement of the head of the user, and an image-position setting unit configured to change, on the basis of a cyclical change in the position of the head of the user predicted on the basis of the detected movement of the head, the position of the image light in a region where the image-light generating unit is capable of generating the image light.

10 Claims, 7 Drawing Sheets

(56) References Cited

U.S. PATENT DOCUMENTS

| | | | | |
|---|---|---|---|---|
| 2002/0133264 A1* | 9/2002 | Maiteh | ............... | G05B 19/4097 |
| | | | | 700/182 |
| 2012/0154277 A1* | 6/2012 | Bar-Zeev | ............. | G02B 27/017 |
| | | | | 345/158 |
| 2012/0242560 A1* | 9/2012 | Nakada | ................ | G09G 3/3406 |
| | | | | 345/8 |

OTHER PUBLICATIONS

Nov. 19, 2014 Written Opinion issued in International Patent Application No. PCT/JP2014/004606.
Moore, Steven T. et al., "Effect of viewing distance on the generation of vertical eye movements during locomotion", Experimental Brain Research, Jan. 1, 1999, vol. 129, XP001051291, pp. 347-361.
Hirasaki, Eishi, "Head Movement and Eyeball Movement for Maintaining Visual Line Stability during a Walk", pp. 180.

* cited by examiner

[Fig. 1]
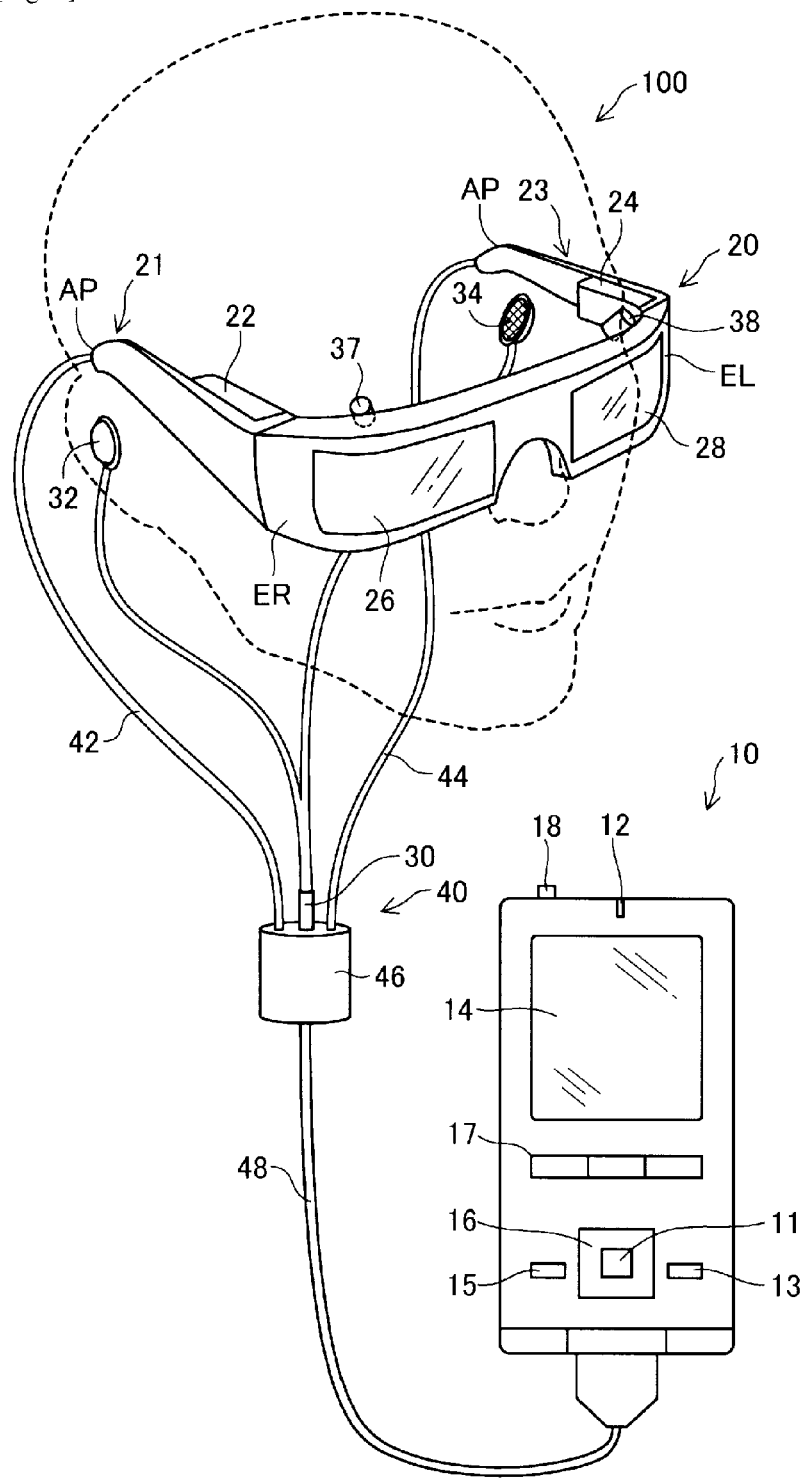

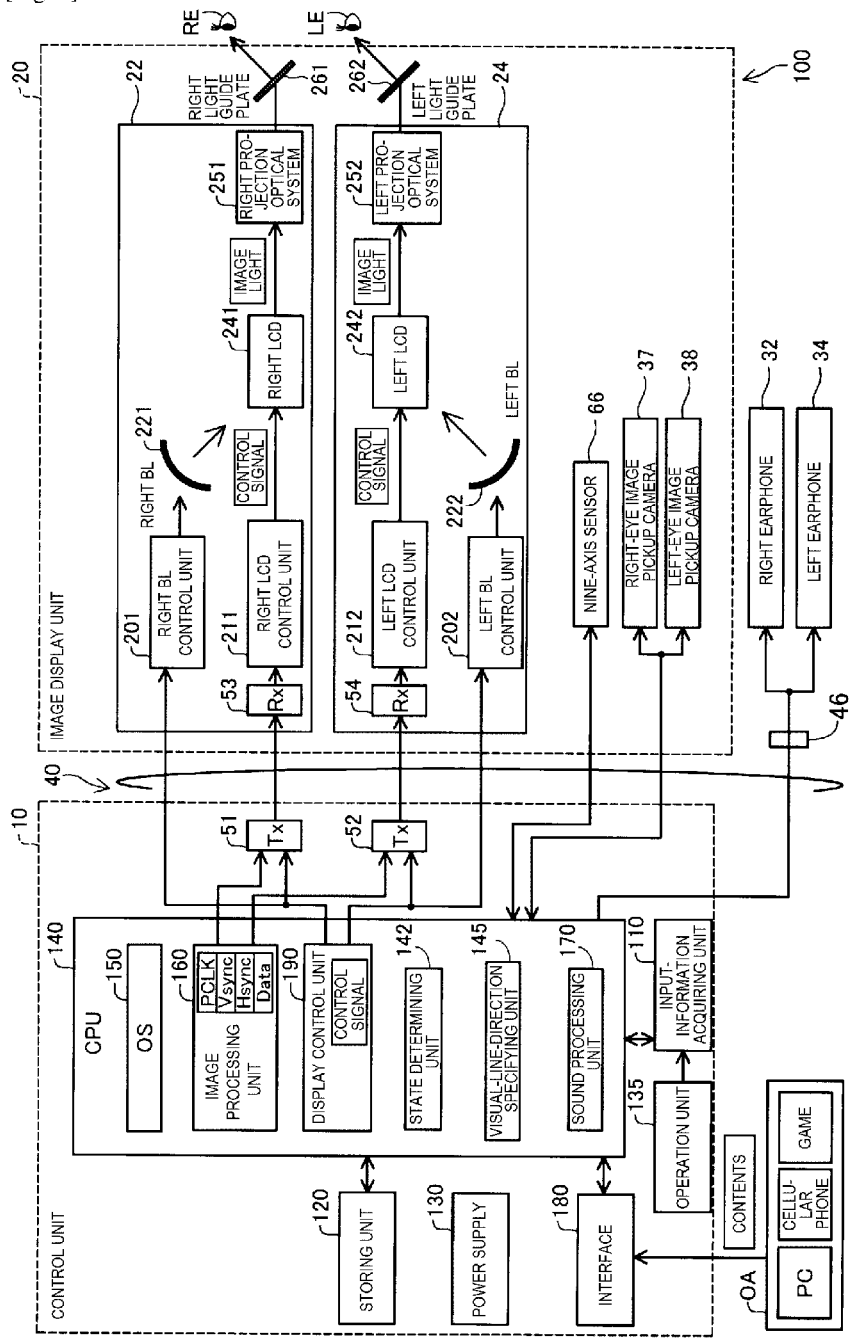
[Fig. 2]

[Fig. 3]
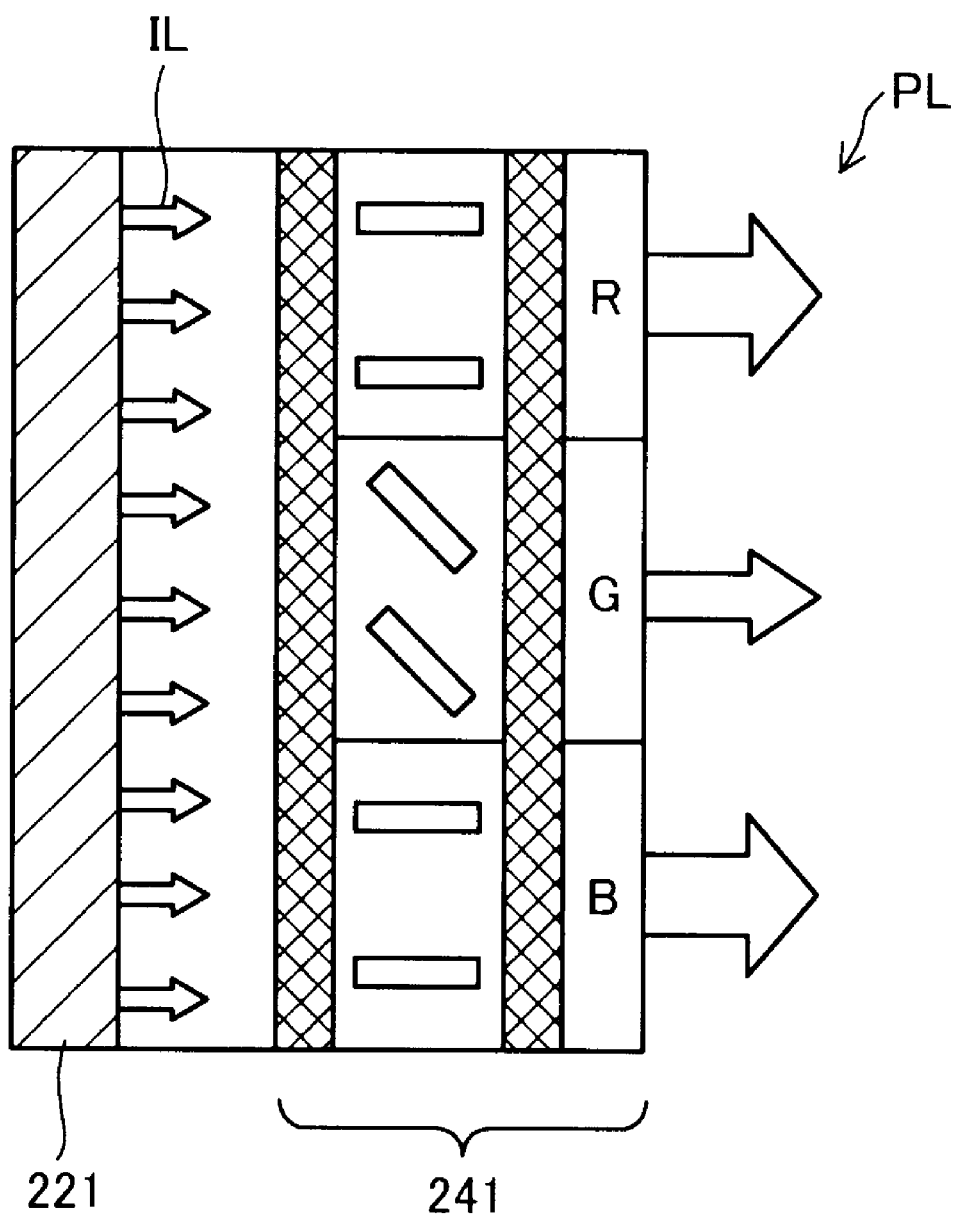

[Fig. 4]
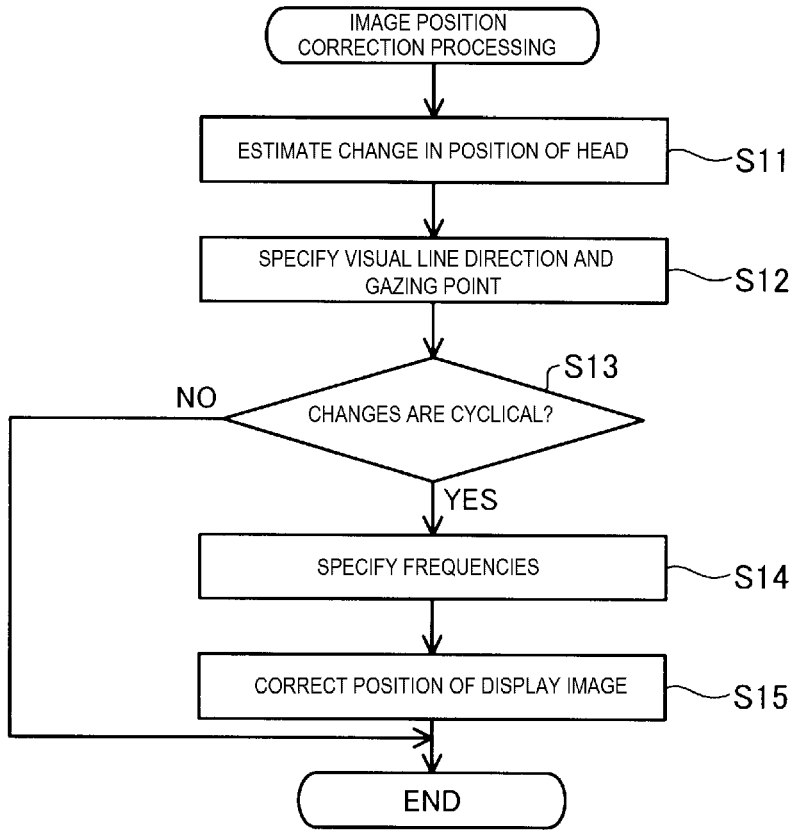
[Fig. 5]
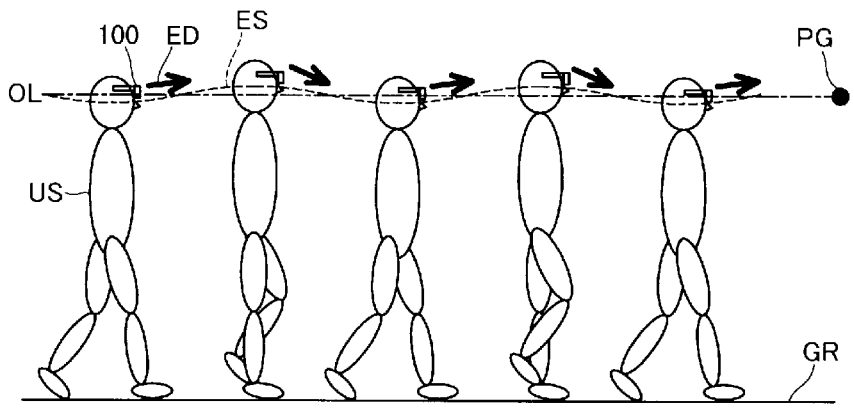

[Fig. 6]
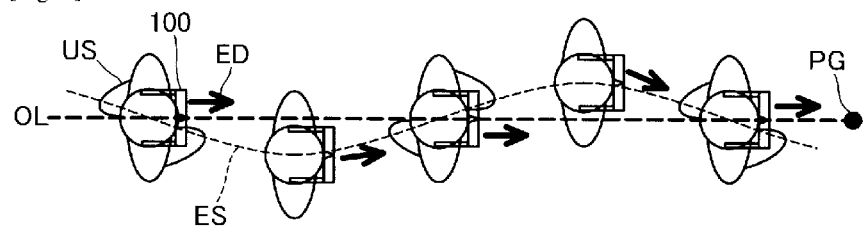
[Fig. 7]
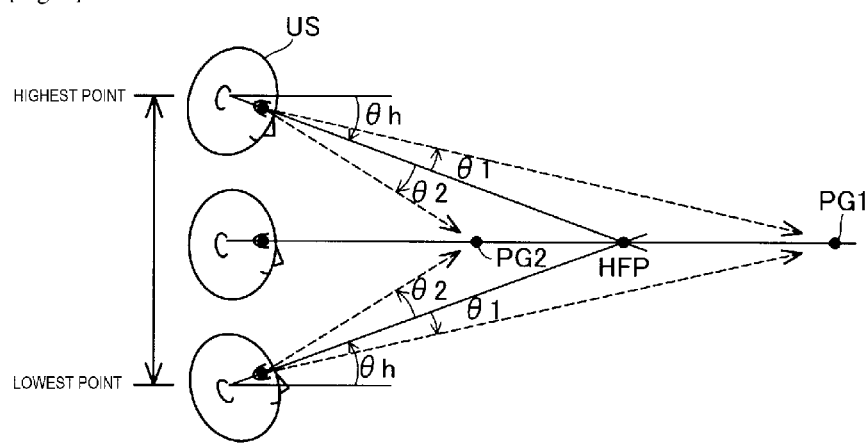
[Fig. 8]
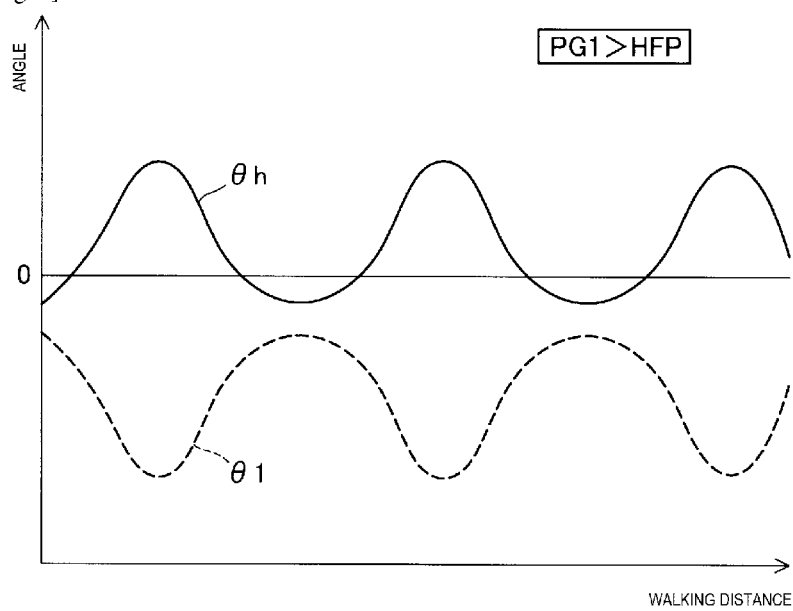

[Fig. 9]
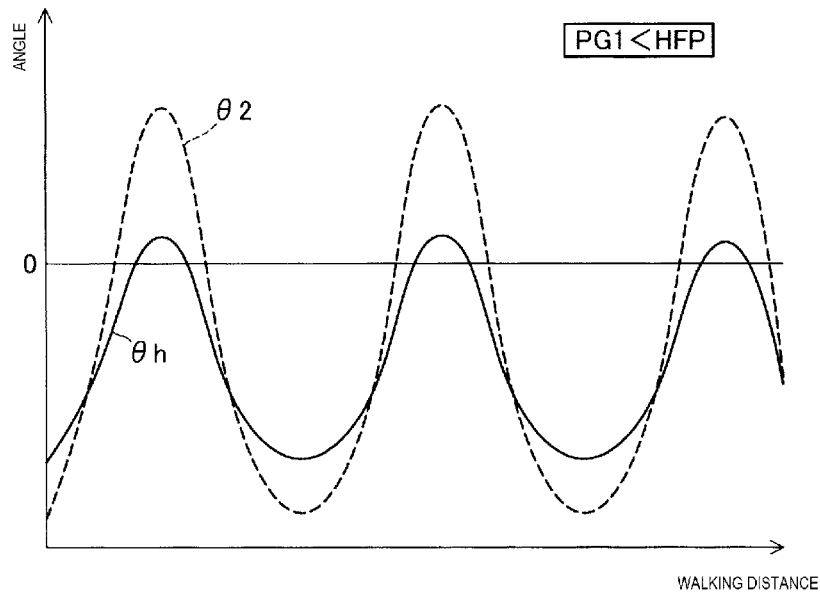
[Fig. 10]
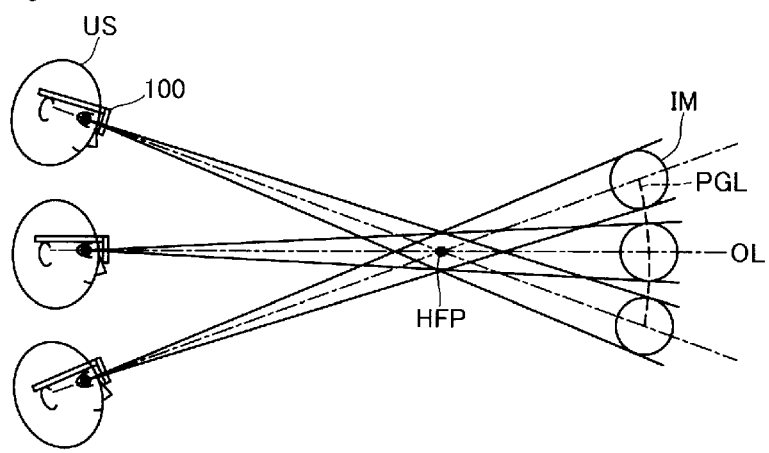

[Fig. 11]
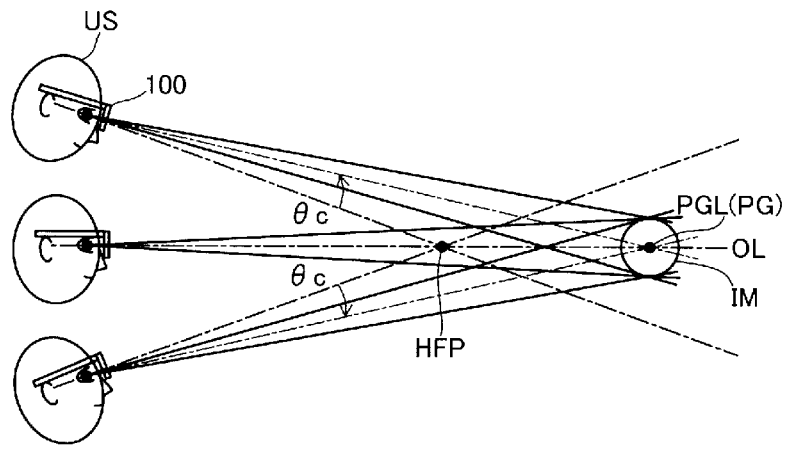
[Fig. 12A]
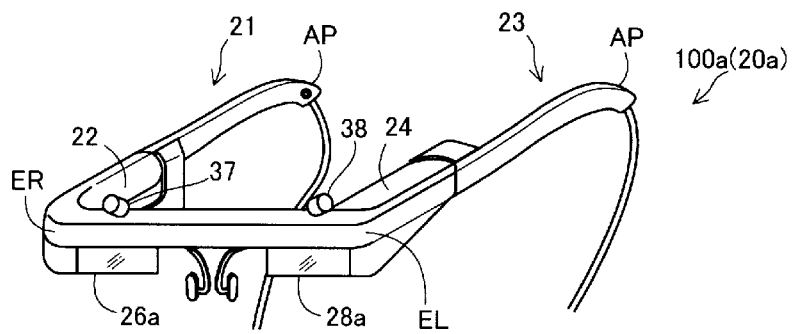
[Fig. 12B]
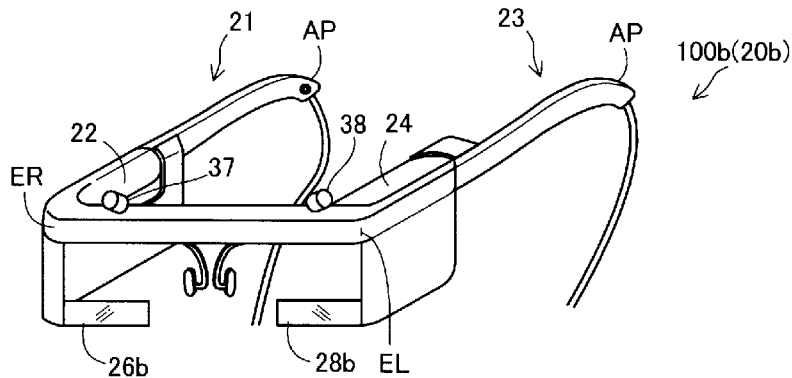

HEAD MOUNTED DISPLAY DEVICE AND CONTROL METHOD FOR HEAD MOUNTED DISPLAY DEVICE

TECHNICAL FIELD

The present invention relates to a head mounted display device.

BACKGROUND ART

A head mounted display device (a head mounted display; HMD), which is a display device used while being mounted on the head, is known. For example, the head mounted display device generates, using a liquid crystal display and a light source, image light representing an image and guides the generated image light to the eyes of a user using a projection optical system and a light guide plate to thereby cause the user to visually recognize a virtual image.

PTL 1 discloses a technique for generating image light in a region for formation of a virtual image to fix the position of the image light with respect to an outside scene image visually recognized through a head mounted display device to cause a user to visually recognize the image light and the outside scene image as one image.

CITATION LIST

Patent Literature

PTL 1: JP-A-2011-59435

Non Patent Literature

NPL 1: Eishi Hirasaki "Head Movement and Eyeball movement for Maintaining Visual Line Stability during a Walk", Osaka University Knowledge Archive 26, March 2000, p. 177 to 193

SUMMARY OF INVENTION

Technical Problem

In the head mounted display device described in PTL 1, the image light and the outside scene are visually recognized by the user as one image. However, for example, in the case of image light like a content moving image, it is sometimes desired to allow the image light to be always visually recognized according to the movement of the head of the user without being integrated with the outside scene. Then, for example, when the user is walking, it is desired to not integrate the image light with the outside scene and to reduce a positional deviation between the outside scene and the image light.

Solution to Problem

An advantage of some aspects of the invention is to solve at least a part of the problems described above, and the invention can be implemented as the following aspects.

(1) An aspect of the invention provides a head mounted display device. The head mounted display device includes: an image display unit including an image-light generating unit configured to generate image light on the basis of image data and emit the image light, the image display unit causing, in a state in which the image display unit is worn on the head of a user, the user to visually recognize the image light as a virtual image and transmitting an outside scene; a detecting unit configured to detect the movement of the head of the user; and an image-position setting unit configured to change, on the basis of a cyclical change in the position of the head of the user predicted on the basis of the detected movement of the head, the position of the image light in a region where the image-light generating unit is capable of generating the image light. With the head mounted display device in this aspect, a position where the image light is generated is corrected according to the predicted change in the position of the head of the user. Therefore, it is possible to cause the moving user to visually recognize the image light having the same size and reduce deviation between the outside scene visually recognized by the user through the image display unit and the generated image light. Consequently, it is possible to suppress a sense of incongruity of the generated image light with respect to the outside scene visually recognized by the user and suppress image sickness caused in the user by the deviation between the outside scene visually recognized by the user and the generated image light.

(2) In the head mounted display device in the aspect described above, the head mounted display device may further include a visual-line-direction specifying unit configured to specify a visual line direction of the user. The image-position setting unit may change the position of the image light on the basis of a cyclical change in the specified visual line direction. With the head mounted display device in this aspect, the position where the image light is generated is corrected taking into account the visual line direction of the user in addition to changes in the position and the direction of the head of the user. Consequently, it is possible to further suppress a sense of incongruity of the generated image light with respect to the outside scene visually recognized by the user.

(3) In the head mounted display device in the aspect described above, the head mounted display device may further include a visual-line specifying unit configured to specify a visual line direction of the user. The image-position setting unit may change the position of the image light on the basis of a head base point separated a predetermined distance from the eye of the user serving as a base point of the cyclical change in the position of the head and a gazing point of the user specified on the basis of the visual line direction. With the head mounted display device in this aspect, the position where the image light is generated is corrected on the basis of the head base point set according to a moving state of the user and the gazing point that the user views. Consequently, it is possible to further suppress a sense of incongruity of the generated image light with respect to the outside scene visually recognized by the user.

(4) In the head mounted display device in the aspect described above, the image-position setting unit may change the position of the image light in a direction same as the direction of the predicted change in the position of the head when a gazing point distance from the eye of the user to the gazing point is smaller than the predetermined distance and change the position of the image light in a direction opposite to the direction of the predicted change in the position of the head when the gazing point distance is larger than the predetermined distance. With the head mounted display device in this aspect, the position where the image light is generated is corrected on the basis of the head base point set according to a moving state of the user and the gazing point that the user views. Consequently, it is possible to further suppress a sense of incongruity of the generated image light with respect to the outside scene visually recognized by the user.

(5) In the head mounted display device in the aspect described above, the image-light generating unit may be formed by a plurality of pixels. The image-position setting unit may change the position of the image light by changing the position of a pixel where the image light is generated in the image-light generating unit. With the head mounted display device in this aspect, the position where the image light is generated is simply set. The deviation between the outside scene visually recognized by the user and the generated image light is easily corrected.

Not all of a plurality of components of the aspects of the invention explained above are essential. To solve a part or all of the problems or to attain a part or all of the effects described in this description, concerning a part of the plurality of components, it is possible to perform, as appropriate, change, deletion, replacement with new other components, and deletion of a part of limited contents. To solve a part or all of the problems or to attain a part or all of the effects described in this description, it is also possible to combine a part or all of technical features included in one aspect of the invention with a part or all of technical features included in the other aspects of the invention to form independent one aspect of the invention.

For example, one aspect of the invention can be implemented as a device including at least one or more or all of the three components, that is, the image display unit, the detecting unit, and the image-position setting unit. That is, the device may include or may not include the image display unit. The device may include or may not include the detecting unit. The device may include or may not include the image-position setting unit. The image display unit may include, for example, an image-light generating unit configured to generate image light on the basis of image data and emit the image light. The image display unit may cause the user to visually recognize the image light as the virtual image and may transmit the outside scene in a state in which the image display unit is worn on the head of the user. The detecting unit may detect, for example, the movement of the head of the user. The image-position setting unit may change, for example, on the basis of a cyclical change in the position of the head of the user predicted on the basis of the detected movement of the head, the position of the image light in the region where the image-light generating unit is capable of generating the image light. The device can be implemented as, for example, a head mounted display device and can also be implemented as devices other than the head mounted display device. According to such a form, it is possible to attain at least one of various objects such as improvement of operability and simplification of the device, integration of the device, and improvement of convenience for the user who uses the device. A part or all of the technical features of the aspects of the head mounted display device explained above can be applied to this device.

The invention can be implemented in various forms other than the head mounted display device. For example, the invention can be implemented in forms such as a control method for the head mounted display device, a head mounted display system, a computer program for implementing functions of the head mounted display system, a recording medium having recorded therein the computer program, and a data signal including the computer program and embodied in a carrier wave.

BRIEF DESCRIPTION OF DRAWINGS

FIG. 1 is an explanatory diagram showing the external configuration of a head mounted display device 100.

FIG. 2 is a block diagram functionally showing the configuration of the head mounted display device 100.

FIG. 3 is an explanatory diagram showing a state in which image light is emitted by an image-light generating unit.

FIG. 4 is an explanatory diagram showing a flow of image position correction processing.

FIG. 5 is an explanatory diagram showing the transition of a change in the position of the head during walking of a user US of the head mounted display device 100.

FIG. 6 is an explanatory diagram showing the transition of a change in the position of the head during walking of the user US of the head mounted display device 100.

FIG. 7 is an explanatory diagram showing a relation between changes in the position and the direction of the head and a change in a visual line direction ED of the user US.

FIG. 8 is an explanatory diagram showing the transition of the direction of the head and the visual line direction ED of the user US with respect to a walking distance of the user US.

FIG. 9 is an explanatory diagram showing the transition of the direction of the head and the visual line direction ED of the user US with respect to a walking distance of the user US.

FIG. 10 is an explanatory diagram showing an example of a display image IM visually recognized by the user US before the position of the display image IM is corrected.

FIG. 11 is an explanatory diagram showing an example of the display image IM visually recognized by the user US after the position of the display image IM is corrected.

FIG. 12A is an explanatory diagram showing the external configuration of a head mounted display device in a modification.

FIG. 12B is an explanatory diagram showing the external configuration of a head mounted display device in a modification.

DESCRIPTION OF EMBODIMENT

A-1. Configuration of a Head Mounted Display Device

FIG. 1 is an explanatory diagram showing the external configuration of a head mounted display device 100. The head mounted display device 100 is a display device mounted on a head and is called head mounted display (HMD) as well. The head mounted display device 100 in this embodiment is a head mounted display device of an optical transmission type that can cause a user to visually recognize a virtual image and cause the user to directly visually recognize an outside scene. Note that, in this description, a virtual image visually recognized by the user using the head mounted display device 100 is referred to as "display image" as well for convenience. Emitting image light generated on the basis of image data is referred to as "displaying an image" as well.

The head mounted display device 100 includes an image display unit 20 configured to cause the user to visually recognize a virtual image in a state in which the image display unit 20 is worn on the head of the user and a control unit 10 (a controller 10) configured to control the image display unit 20.

The image display unit 20 is a wearing body worn on the head of the user and has an eyeglass shape in this embodiment. The image display unit 20 includes a right holding unit 21, a right display driving unit 22, a left holding unit 23, a left display driving unit 24, a right optical-image display unit 26, a left optical-image display unit 28, a right-eye image pickup camera 37, and a left-eye image pickup camera 38. The right optical-image display unit 26 and the left optical-image display unit 28 are respectively arranged to be located in front of the right and left eyes of the user when the user wears the image display unit 20. One end of the right optical-image display unit 26 and one end of the left optical-image display unit 28 are connected to each other in a position corresponding to the middle of the forehead of the user when the user wears the image display unit 20.

The right holding unit 21 is a member provided to extend from an end ER, which is the other end of the right optical-image display unit 26, to a position corresponding to the temporal region of the user when the user wears the image display unit 20. Similarly, the left holding unit 23 is a member provided to extend from an end EL, which is the other end of the left optical-image display unit 28, to a position corresponding to the temporal region of the user when the user wears the image display unit 20. The right holding unit 21 and the left holding unit 23 hold the image display unit 20 on the head of the user in the same manner as temples of eyeglasses.

The right display driving unit 22 and the left display driving unit 24 are arranged on sides opposed to the head of the user when the user wears the image display unit 20. Note that, in the following explanation, the right holding unit 21 and the left holding unit 23 are generally simply referred to as "holding unit" as well. The right display driving unit 22 and the left display driving unit 24 are generally simply referred to as "display driving unit" as well. The right optical-image display unit 26 and the left optical-image display unit 28 are generally simply referred to as "optical-image display unit" as well.

The display driving units 22 and 24 (see FIGS. 1 and 2) include liquid crystal displays 241 and 242 (hereinafter referred to as "LCDs 241 and 242" as well) and projection optical systems 251 and 252 (see FIG. 2). Details of the configuration of the display driving units 22 and 24 are explained below. The optical-image display units 26 and 28 (see FIG. 1) functioning as optical members include light guide plates 261 and 262 (see FIG. 2) and dimming plates. The light guide plates 261 and 262 are formed of a light transmissive resin material or the like and guide image lights output from the display driving units 22 and 24 to the eyes of the user. The dimming plates are thin plate-like optical elements and arranged to cover the front side of the image display unit 20, which is a side opposite to the eye side of the user. The dimming plates protect the light guide plates 261 and 262 and suppress damage, adhesion of stain, and the like to the light guide plates 261 and 262. By adjusting the light transmittance of the dimming plates, it is possible to adjust an amount of external light entering the eyes of the user and adjust easiness of visual recognition of a virtual image. Note that the dimming plates can be omitted.

The right-eye image pickup camera 37 and the left-eye image pickup camera 38 (hereinafter referred to as "eye image pickup cameras 37 and 38" as well) are small CCD cameras that respectively pick up images of the right eye and the left eye of the user. Note that an external scene refers to reflected light that is reflected on an object (e.g., a building) included in a predetermined range and can be visually recognized by the user.

The image display unit 20 further includes a connecting unit 40 for connecting the image display unit 20 to the control unit 10. The connecting unit 40 includes a main body cord 48 connected to the control unit 10, a right cord 42 and a left cord 44, and a coupling member 46. The right cord 42 and the left cord 44 are two cords branching from the main body cord 48. The right cord 42 is inserted into a housing of the right holding unit 21 from a distal end portion AP in an extending direction of the right holding unit 21 and connected to the right display driving unit 22. Similarly, the left cord 44 is inserted into a housing of the left holding unit 23 from a distal end portion AP in an extending direction of the left holding unit 23 and connected to the left display driving unit 24. The coupling member 46 is provided at a branching point of the main body cord 48 and the right and left cords 42 and 44. The coupling member 46 includes a jack for connecting an earphone plug 30. A right earphone 32 and a left earphone 34 extend from the earphone plug 30.

The image display unit 20 and the control unit 10 perform transmission of various signals via the connecting unit 40. Connectors (not shown in the figure), which fit with each other, are respectively provided at an end of the main body cord 48 on the opposite side of the coupling member 46 and in the control unit 10. The control unit 10 and the image display unit 20 are connected and disconnected according to fitting and unfitting of the connector of the main body cord 48 and the connector of the control unit 10. For example, a metal cable or an optical fiber can be adopted as the right cord 42, the left cord 44, and the main body cord 48.

The control unit 10 is a device for controlling the head mounted display device 100. As shown in FIG. 1, the control unit 10 includes a determination key 11, a lighting unit 12, a display switching key 13, a track pad 14, a luminance switching key 15, a direction key 16, a menu key 17, and a power switch 18. The determination key 11 detects pressing operation and outputs a signal for determining content of operation in the control unit 10. The lighting unit 12 notifies, with a light emission state thereof, an operation state of the head mounted display device 100. As the operation state of the head mounted display device 100, for example, there is ON/OFF of a power supply. As the lighting unit 12, for example, an LED (Light Emitting Diode) is used. The display switching key 13 detects pressing operation and outputs, for example, a signal for switching a display mode of a content moving image to 3D and 2D. The track pad 14 detects operation by a finger of the user on an operation surface of the track pad 14 and outputs a signal corresponding to detected content. As the track pad 14, various track pads such as an electrostatic type, a pressure detection type, and an optical type can be adopted. The luminance switching key 15 detects pressing operation and outputs a signal for increasing and reducing the luminance of the image display unit 20. The direction key 16 detects pressing operation for keys corresponding to up, down, left, and right directions and outputs a signal corresponding to detected content. The power switch 18 detects slide operation of the switch to switch a state of a power supply of the head mounted display device 100.

FIG. 2 is a block diagram functionally showing the configuration of the head mounted display device 100. As shown in FIG. 2, the control unit 10 includes an input-information acquiring unit 110, a storing unit 120, a power supply 130, an operation unit 135, a CPU 140, an interface 180, a transmitting unit 51 (Tx 51), and a transmitting unit 52 (Tx 52). The operation unit 135 receives operation by the user. The operation unit 135 is configured by the determination key 11, the display switching key 13, the track pad 14, the luminance switching key 15, the direction key 16, the menu key 17, and the power switch 18.

The input-information acquiring unit 110 acquires a signal corresponding to an operation input by the user. As the operation input, for example, there are operation inputs to the track pad 14, the direction key 16, and the power switch 18 arranged on the operation unit 135. The power supply 130 supplies electric power to the units of the head mounted display device 100. As the power supply 130, for example, a secondary battery can be used. The storing unit 120 has stored therein various computer programs. The storing unit 120 is configured by a ROM, a RAM, and the like. The CPU 140 reads out and executes the computer programs stored in the storing unit 120 to thereby function as an operating system 150 (OS 150), a display control unit 190, a sound processing unit 170, a state determining unit 142, a visual-line-direction specifying unit 145, and an image processing unit 160.

The display control unit 190 generates control signals for controlling the right display driving unit 22 and the left display driving unit 24. Specifically, the display control unit 190 individually controls, using the control signals, ON/OFF of driving of the right LCD 241 by a right LCD control unit 211, ON/OFF of driving of a right backlight 221 by a right backlight control unit 201, ON/OFF of driving of the left LCD 242 by a left LCD control unit 212, and ON/OFF of driving of a left backlight 222 by a left backlight control unit 202. Consequently, the display control unit 190 controls generation and emission of image lights by the right display driving unit 22 and the left display driving unit 24. For example, the display control unit 190 causes both of the right display driving unit 22 and the left display driving unit 24 to generate image lights, causes only one of the right display driving unit 22 and the left display driving unit 24 to generate image light, or causes both of the right display driving unit 22 and the left display driving unit 24 not to generate image light.

The display control unit 190 transmits the control signals to the right LCD control unit 211 and the left LCD control unit 212 respectively via the transmitting units 51 and 52. The display control unit 190 transmits the control signals respectively to the right backlight control unit 201 and the left backlight control unit 202.

The visual-line-direction specifying unit 145 specifies a visual line direction of the user by analyzing images of the right eye and the left eye of the user respectively picked up by the eye image pickup cameras 37 and 38. The visual-line-direction specifying unit 145 can estimate, according to the specified visual line direction, a position viewed by the user. Therefore, the visual-line-direction specifying unit 145 can specify a gazing point of the user (e.g., a gazing point PG1 and a gazing point PG2 shown in FIG. 7). The state determining unit 142 determines the direction and the movement of the image display unit 20 detected by a nine-axis sensor 66 explained below to thereby estimate a change in the position of the head of the user. For example, when the user is walking, a moving direction of the user is specified by the change in the position of the head. The head of the user cyclically fluctuates in the vertical direction and the horizontal direction along the moving direction (e.g., FIG. 6). Therefore, the state determining unit 142 can specify walking speed of the user, specify the cyclical change in the position of the head and a change in a visual line direction of the user, and specify a frequency of the change in the position of the head in the vertical direction and the horizontal direction and a frequency of the change in the visual line direction. Note that a predicted movement of a human means a movement that could be predicted in the human engineering on the basis of physical characteristics such as physical shapes of regions of the human, motions of the regions performed in walking or the like, and physiological reactions and changes of the human. The eye image pickup cameras 37 and 38 and the visual-line-direction specifying unit 145 are equivalent to a visual-line-direction specifying unit in claims.

The image processing unit 160 acquires an image signal included in contents. The image processing unit 160 separates synchronization signals such as a vertical synchronization signal VSync and a horizontal synchronization signal HSync from the acquired image signal. The image processing unit 160 generates a clock signal PCLK using a PLL (Phase Locked Loop) circuit or the like (not shown in the figure) according to cycles of the separated vertical synchronization signal VSync and horizontal synchronization signal HSync. The image processing unit 160 converts an analog image signal, from which the synchronization signals are separated, into a digital image signal using an A/D conversion circuit or the like (not shown in the figure). Thereafter, the image processing unit 160 stores the digital image signal after side the conversion in a DRAM in the storing unit 120 frame by frame as image data (RGB data) of a target image. Note that the image processing unit 160 may execute image processing such as resolution conversion processing, various kinds of tone correction processing such as adjustment of luminance and chroma, and keystone correction processing on the image data according to necessity.

The image processing unit 160 transmits the clock signal PCLK, the vertical synchronization signal VSync, and the horizontal synchronization signal HSync generated by the image processing unit 160 and image data Data stored in the DRAM in the storing unit 120 respectively via the transmitting units 51 and 52. Note that the image data Data transmitted via the transmitting unit 51 is referred to as "image data for right eye" as well and the image data Data transmitted via the transmitting unit 52 is referred to as "image data for left eye" as well. The transmitting units 51 and 52 function as a transceiver for serial transmission between the control unit 10 and the image display unit 20.

When the state determining unit 142 determines that the head of the user cyclically changes, the image processing unit 160 corrects the image data on the basis of the specified frequencies of the change in the position of the head and the change in the visual line direction of the user and transmits the image data to the image display unit 20. Examples of contents of the correction of the image data include correction for suppressing the influence of the change in the visual line direction with respect to an outside scene visually recognized by the user through the image display unit 20. Note that the image processing unit 160 and the state determining unit 142 are equivalent to an image-position setting unit in claims.

The sound processing unit 170 acquires a sound signal included in the contents, amplifies the acquired sound signal, and supplies the amplified sound signal to a speaker (not shown in the figure) in the right earphone 32 and a speaker (not shown in the figure) in the left earphone 34 connected to the coupling member 46. Note that, for example, when a Dolby (registered trademark) system is adopted, processing for the sound signal is performed. Different sounds, the frequencies or the like of which are varied, are respectively output from the right earphone 32 and the left earphone 34.

The interface 180 is an interface for connecting various external apparatuses OA, which are supply sources of contents, to the control unit 10. Examples of the external apparatuses OA include a personal computer PC, a cellular phone terminal, and a game terminal. As the interface 180, for example, a USB interface, a micro USB interface, or an interface for a memory card can be used.

The image display unit 20 includes the right display driving unit 22, the left display driving unit 24, the right light guide plate 261 functioning as the right optical-image display unit 26, the left light guide plate 262 functioning as the left optical-image display unit 28, the nine-axis sensor 66, the right-eye image pickup camera 37, and the left-eye image pickup camera 38.

The nine-axis sensor 66 is a motion sensor configured to detect acceleration (three axes), angular velocity (three axes), and terrestrial magnetism (three axes). Since the nine-axis sensor 66 is provided in the image display unit 20, when the image display unit 20 is worn on the head of the user, the nine-axis sensor 66 detects the position of the head of the user and a change in the position. A direction of the image display unit 20 is specified from the detected position of the head of the user. Note that the nine-axis sensor 66 and the state determining unit 142 are equivalent to a detecting unit in claims.

The right display driving unit 22 includes a receiving unit 53 (Rx 53), the right backlight control unit 201 (right BL control unit 201) and the right backlight 221 (right BL 221) functioning as a light source, the right LCD control unit 211 and the right LCD 241 functioning as a display element, and the right projection optical system 251. The right backlight control unit 201 and the right backlight 221 function as the light source. The right LCD control unit 211 and the right LCD 241 function as the display element. Note that the right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 drives the right backlight 221 on the basis of an input control signal. The right backlight 221 is, for example, a light emitting body such as an LED or an electro-luminescence (EL). The right LCD control unit 211 drives the right LCD 241 on the basis of the clock signal PCLK, the vertical synchronization signal VSync, the horizontal synchronization signal HSync, and the image data for right eye input via the receiving unit 53. The right LCD 241 is a transmissive liquid crystal panel on which a plurality of pixels are arranged in a matrix shape.

The right projection optical system 251 is configured by a collimate lens that changes the image light emitted from the right LCD 241 to light beams in a parallel state. The right light guide plate 261 functioning as the right optical-image display unit 26 guides the image light output from the right projection optical system 251 to a right eye RE of the user while reflecting the image light along a predetermined optical path. Note that the right projection optical system 251 and the right light guide plate 261 are collectively referred to as "light guide unit" as well.

The left display driving unit 24 includes a configuration same as the configuration of the right display driving unit 22. The left display driving unit 24 includes a receiving unit 54 (Rx 54), the left backlight control unit 202 (left BL control unit 202) and the left backlight 222 (left BL 222) functioning as a light source, the left LCD control unit 212 and the left LCD 242 functioning as a display element, and the left projection optical system 252. The left backlight control unit 202 and the left backlight 222 function as the light source. The left LCD control unit 212 and the left LCD 242 function as the display element. Note that the left backlight control unit 202, the left LCD control unit 212, the left backlight 222, and the left LCD 242 are collectively referred to as "image-light generating unit" as well. The left projection optical system 252 is configured by a collimate lens that changes the image light emitted from the left LCD 242 to light beams in a parallel state. The left light guide plate 262 functioning as the left optical-image display unit 28 guides the image light output from the left projection optical system 252 to a left eye LE of the user while reflecting the image light along a predetermined optical path. Note that the left projection optical system 252 and the left light guide plate 262 are collectively referred to as "light guide unit" as well.

FIG. 3 is an explanatory diagram showing a state in which image light is emitted by the image-light generating unit. The right LCD 241 drives liquid crystals in the positions of the pixels arranged in the matrix shape to thereby change the transmittance of light transmitted through the right LCD 241 to modulate illumination light IL irradiated from the right backlight 221 into effective image light PL representing an image. The same applies to the left side. Note that, although the backlight system is adopted in this embodiment as shown in FIG. 3, the image light may be emitted using a front light system or a reflection system.

A-2. Image Position Correction Processing

FIG. 4 is an explanatory diagram showing a flow of image position correction processing. The image position correction processing is processing in which a cyclical movement of the user is specified on the basis of an estimated change in the position of the head and a specified visual line direction of the user and the position of a display image is corrected to eliminate deviation between an outside scene and the display image involved in the movement of the user.

In the image position correction processing, first, the state determining unit 142 determines the direction and the movement of the image display unit 20 detected by the nine-axis sensor 66 to estimate a change in the position of the head of the user (step S11). Subsequently, the visual-line-direction specifying unit 145 specifies a visual line direction and a gazing point of the user using picked-up images of the eye image pickup cameras 37 and 38 (step S12). Subsequently, the state determining unit 142 determines whether the change in the position of the head and a change in the visual line direction of the user are cyclical (step S13).

FIGS. 5 and 6 are explanatory diagrams showing the transition of a change in the position of the head during walking of a user US of the head mounted display device 100. In FIG. 5, the transition of a change in the vertical direction of the position of the head of the user US during walking of the user US is shown. As shown in FIG. 5, the position of the head of the user US during walking cyclically changes along the vertical direction. The position of the eyes of the user US changes along the vertical direction and draws a track ES. When both the feet of the user US are on a ground GR, the position of the head of the user US is in a lowest position (hereinafter referred to as "lowest point" as well) along the vertical direction. When only one foot of the user US is on the ground GR and the other foot crosses the foot on the ground GR along the moving direction, the position of the head of the user US is in a highest position (hereinafter referred to as "highest point" as well) along the vertical direction. In this embodiment, a gazing point PG is present on a horizontal axis OL that passes an intermediate point between the lowest point and the highest point in the vertical direction.

A visual line direction ED of the user US changes to correct the cyclical change in the position of the head. When the user US is walking while viewing the gazing point PG, if the position of the head of the user US is in a position lower than the horizontal axis OL, the visual line direction ED is directed above the horizontal direction. Conversely, if the position of the head of the user US is in a position higher than the horizontal axis OL along the vertical direction, the visual line direction ED is directed below the horizontal direction.

In FIG. 6, the transition of a change in the horizontal direction of the position of the head of the user US during walking is shown. As shown in FIG. 6, when the user US is walking, if only the right foot of the user US is on the ground GR and the head of the user US is at the highest point, the center of the head of the user US is orthogonal to and present on the right side of the moving direction (hereinafter referred to as "rightmost point" as well). If only the left foot of the user US is on the ground GR and the head of the user US is at the highest point, the center of the head of the user US is orthogonal to and present on the left side of the moving direction (hereinafter referred to as "leftmost point" as well). Therefore, the position of the head of the user US in the horizontal direction changes like the track ES along the horizontal axis OL that passes the intermediate point between the rightmost point and the leftmost point. Note that the position of the head of the user US is at the highest point when the center of the head of the user US is present at the rightmost point and the leftmost pint. Therefore, in the change in the position of the head of the user US, a cycle in the vertical direction is a half of a cycle in the horizontal direction. That is, a frequency in the vertical direction is a double of a frequency in the horizontal direction.

FIG. 7 is an explanatory diagram showing a relation between changes in the position and the direction of the head and a change in the visual line direction ED of the user US. In FIG. 7, the direction of the head and the visual line direction ED corrected according to a change in the vertical direction of the position of the head are shown. In NPL 1, when the gazing point PG is 2 meters away from the user US, a point where a naso-occipital axis is focused by pitch rotation of the head (a head fixation point; hereinafter referred to as "head base point HFP") is closer to the user US than the gazing point PG. That is, according to the description of NPL 1, in this case, the direction of the head excessively compensates for up and down movements and, in order to supplement deviation of the direction of the head, cyclical compensatory rotation of the eyes is necessary during walking. According to the description, although a pitch motion of the head slightly changes according to the distance from the user US to the gazing point PG, an amount of the change is very small.

As shown in FIG. 7, when the user US is viewing the gazing point PG1 present in a position farther from the eyes of the user US than the head base point HFP, the visual line direction ED of the user US changes in a direction opposite to the direction of the head of the user US. For example, when the position of the head of the user US is present at the highest point, the direction of the head of the user US is tilted downward by an angle theta-h along the vertical direction with respect to the horizontal axis OL. However, the direction of the visual line direction ED of the user US is tilted upward by an angle theta-1 along the vertical direction with respect to the direction of the head of the user US. As shown in FIG. 7, when the user US is viewing the gazing point PG2 present in a position closer from the eyes of the user US than the head base point HFP, the visual line direction ED of the user US changes in a direction same as the direction of the head of the user US. For example, when the position of the head of the user US is present at the highest point, the direction of the head of the user US is tilted downward by the angle theta-h along the vertical direction with respect to the horizontal axis OL. However, the direction of the visual line direction ED of the user US is further tilted downward by an angle theta-2 along the vertical direction with respect to the direction of the head of the user US.

FIGS. 8 and 9 are explanatory diagrams showing the transition of the direction of the head and the visual line direction ED with respect to a walking distance of the user US. In FIG. 8, the transition of the angle theta-h of the direction of the head with respect to the walking distance of the user US (FIG. 7) and the angle theta-1 of the visual line direction ED with respect to the direction of the head of the user US (FIG. 7) is shown. The transition occurs when the user US is viewing the gazing point PG1 farther away from the user US than the head base point HFP. In FIG. 8, as an angle of the ordinate, an angle upward with respect to the horizontal axis OL is set to a positive value and an angle downward with respect to the horizontal axis OL is set to a negative value. As shown in FIG. 8, the direction of the visual line direction ED of the user US changes in a direction opposite to the direction of the head of the user US. Therefore, when the angle theta-h of the direction of the head is a maximum, the angle theta-1 of the direction of the visual line direction ED takes a minimum. A relation between the angle theta-h of the direction of the head and the angle theta-1 of the direction of the visual line direction ED is a relation of a phase shift of 180 degrees.

In FIG. 9, the transition of the angle theta-h of the direction of the head with respect to the walking distance of the user US (FIG. 7) and the angle theta-2 of the visual line direction ED (FIG. 7) is shown. The transition occurs when the user US is viewing the gazing point PG2 closer from the user US than the head base point HFP. As shown in FIG. 9, the direction of the visual line direction ED of the user US changes in a direction same as the direction of the head of the user US. Therefore, when the angle theta-h of the direction of the head is a maximum, the angle theta-2 of the direction of the visual line direction ED takes a maximum. A relation between the angle theta-h of the direction of the head and the angle theta-2 of the visual line direction ED is a relation with no phase shift. Note that, in FIGS. 8 and 9, the change in the vertical direction of the position of the head of the user US is explained. However, a change in the horizontal direction of the position of the head of the user US has a half frequency of a frequency of the change in the vertical direction. Although an angle serving as an amplitude is different, the same applies to a change in the visual line direction ED.

When it is determined in the processing of step S13 in FIG. 4 that the change in the position of the head of the user US is cyclical (step S13: YES), the state determining unit 142 specifies frequencies of changes in the position of the head of the user US in the vertical direction and the horizontal direction (step S14). Subsequently, the image processing unit 160 corrects, on the basis of the specified frequencies, the position of the display image to correspond to the cyclical change in the direction of the visual line direction ED (step S15).

FIG. 10 is an explanatory diagram showing an example of a display image IM visually recognized by the user US before the position of the display image IM is corrected. In FIG. 10, the visually recognized display image IM is shown in the gazing point PG farther apart from the eyes of the user US than the head base point HFP. As shown in FIG. 10, the position and the direction of the head of the user US change centering on the head base point HFP. Therefore, when a display position of the display image IM generated in the image-light generating unit does not change, the display image IM is visually recognized by the user US as if the display image IM moves relatively to an outside scene visually recognized through the image display unit 20. For example, when the position of the head of the user US is present at the highest point, compared with when the position of the head of the user US is present at the lowest point, the display image IM is visually recognized by the user US as if the display image IM is present on the lower side along the vertical direction. Therefore, the center of the display image IM draws a track PGL that changes according to the change in the position of the head of the user US.

FIG. 11 is an explanatory diagram showing an example of the display image IM visually recognized by the user US after the position of the display image IM is corrected. As shown in FIG. 11, the image processing unit 160 corrects a position of display of the display image IM according to a change in the visual line direction ED of the user US such that the center of the display image IM overlaps the gazing point PG, which is a fixed point, without drawing the track PGL. As shown in FIG. 11, the distance from the eyes of the user US to the gazing point PG is larger than the distance from the eyes of the user US to the head base point HFP. In this case, an angle theta-c of correction of the display image IM is an angle of correction in a direction opposite to the direction of the head with respect to the horizontal axis OL. Unlike the example shown in FIG. 11, when the distance from the eyes of the user US to the gazing point PG is smaller than the distance from the eyes of the user US to the head base point HFP, the angle theta-c of correction is an angle of correction in a direction same as the direction of the head with respect to the horizontal axis OL.

The image-light generating unit, which generates the display image IM, is configured by a plurality of pixels. The image-light generating unit changes pixels forming the display image IM to change the display position of the display image IM in the image-light generating unit. Each of the plurality of pixels is associated in advance with a solid angle visually recognized by the user US. Therefore, the image processing unit 160 can correct a relative position of the display image IM with respect to the outside scene visually recognized by the user US through the image display unit 20 by changing the pixels forming the display image IM according to a predicted cyclical change in the position of the head of the user US and the head base point HFP. Note that the plurality of pixels forming the image-light generating unit in this embodiment are equivalent to a region where image light can be generated in claims. The region where image light can be generated may be a virtual image light emission region where light, which the user US is caused to visually recognize as a virtual image, can be emitted or may be an image light emission region where image light is emitted. The changing the pixels forming the display image IM can also be rephrased as changing a position where image light is emitted or changing an emission region of image light.

When it is determined in the processing of step S13 in FIG. 4 that the change in the position of the head of the user US is not cyclical (step S13: NO), the image processing unit 160 ends the image position correction processing without correcting the display position of the display image IM in the image-light generating unit.

As explained above, in the head mounted display device 100 in this embodiment, the nine-axis sensor 66 and the state determining unit 142 detect the movement of the head of the user US. The image processing unit 160 and the state determining unit 142 change the display position of the display image IM on the basis of the predicted cyclical change in the position of the head of the user US. Therefore, in the head mounted display device 100 in this embodiment, the display position of the display image IM is corrected according to the predicted change in the position of the head of the user US. Therefore, it is possible to cause the moving user US to visually recognize the display image IM in the same size and reduce the deviation between the outside scene visually recognized by the user US through the image display unit 20 and the display image IM. Consequently, it is possible to suppress a sense of incongruity of the display image IM with respect to the outside scene visually recognized by the user US and suppress image sickness caused in the user US by the deviation between the outside scene visually recognized by the user US and the display image IM.

In the head mounted display device 100 in this embodiment, the image processing unit 160 and the state determining unit 142 change the display position of the display image IM on the basis of the cyclical change in the visual line direction ED of the user US. Therefore, in the head mounted display device 100 in this embodiment, the display position of the display image IM is corrected taking into account the visual line direction ED of the user US in addition to the changes in the position and the direction of the head of the user US. Consequently, it is possible to further suppress a sense of incongruity of the display image IM with respect to the outside scene visually recognized by the user US.

In the head mounted display device 100 in this embodiment, the image processing unit 160 and the state determining unit 142 correct the display position of the display image IM on the basis of the head base point HFP the predetermined distance apart from the eyes of the user US and the gazing point PG. When the distance from the eyes of the user US to the gazing point PG is larger than the distance from the eyes of the user US to the head base point HFP, the angle theta-c of correction of the display position of the display image IM is an angle of correction in a direction opposite to the direction of the head with respect to the horizontal axis OL. Conversely, when the distance from the eyes of the user US to the gazing point PG is smaller than the distance from the eyes of the user US to the head base point HFP, the angle theta-c of correction of the display position of the display image IM is an angle of correction in a direction same as the direction of the head with respect to the horizontal axis OL. Therefore, in the head mounted display device 100 in this embodiment, the display position of the display image IM is corrected on the basis of the head base point HFP, which is set according to a moving state of the user US, and the gazing point PG, which the user US is viewing. Consequently, it is possible to further suppress a sense of incongruity of the display image IM with respect to the outside scene visually recognized by the user US.

In the head mounted display device 100 in this embodiment, when the pixels forming the display image IM in the image-light generating unit are changed, the display position of the display image IM is changed. Therefore, the display position of the display image IM is easily set. It is easy to correct the deviation between the outside scene visually recognized by the user US and the display image IM.

B. Modifications

Note that the invention is not limited to the embodiment explained above. The invention can be carried out in various forms without departing from the spirit of the invention. For example, modifications explained below are also possible.

B1. Modification 1

In the embodiment, the visual-line-direction specifying unit 145 specifies the visual line direction ED and the gazing point PG of the user US according to picked-up images of the eyes of the user US picked up by the eye image pickup cameras 37 and 38. However, the visual line direction ED and the gazing point PG of the user US do not always have to be specified. The correction of the display position of the display image IM may be performed according to the cyclical change in the position of the head of the user US. For example, the gazing point PG may be set to infinity (e.g., a distance 2000 times or more as larger as a focal length) to correct the display position of the display image IM. In this modification, even if the visual line direction ED of the user US is not specified, the image processing unit 160 can correct the display position of the display image IM according to the direction of the head of the user US.

In the embodiment, the visual line direction ED of the user US is specified by the visual-line-direction specifying unit 145 and the eye image pickup cameras 37 and 38 and the head base point HFP is specified. However, the head base point HFP does not always have to be specified. The correction of the display position of the display image IM may be performed according to the direction of the head of the user US and the gazing point PG specified according to the visual line direction ED.

The head base point HFP does not have to be specified according to the visual line direction ED of the user US and may be set according to moving means or the like of the user US. When the user US is walking, since it is known that the head base point HFP changes according to moving speed, the head base point HFP may be set according to the moving speed of the user US detected by the nine-axis sensor 66 to correct the display position of the display image IM.

In the example explained in the embodiment, the user US is walking. However, the cyclical change in the position of the head is not limited to the change during the walking of the user US and can be variously modified. For example, the cyclical change in the position of the head may be a change during running of the user US. When the user US rides in an automobile, the display position of the display image IM may be corrected to correct the influence of cyclical vibration of an engine. Patterns of frequencies in moving states of the user US may be stored in advance in the storing unit 120 of the control unit 10. A cyclical change in the position of the head detected by the state determining unit 142 may be collated with the patterns to specify a moving state of the user US. In this modification, since the moving states of the user US are collated with the patterns of the frequencies, by removing a noise frequency according to FFT (Fast Fourier Transform), it is possible to correct the display position of the display image IM to further reduce the deviation between the display position and the outside scene.

In the embodiment, the changes in the position of the head of the user US along the vertical direction and the horizontal direction are detected and the display position of the display image IM is corrected. However, directions of detection are not always limited to these directions and can be variously modified. For example, a cyclical change in the position of the head may be detected only in the vertical direction to correct the display position of the display image IM. Conversely, the detection of a change and the correction of the display position of the display image IM may be performed only in the horizontal direction.

B2. Modification 2

In the embodiment, the small CCD cameras are used as the eye image pickup cameras 37 and 38. However, the eye image pickup cameras 37 and 38 are not always limited to this form and can be variously modified. For example, an image pickup device such as a CMOS image sensor may be used or other image pickup devices may be used. As long as a device that can detect the visual line direction ED of the user US is included in the head mounted display device 100 instead of the eye image pickup cameras 37 and 38, it is possible to further suppress a sense of incongruity of the display image IM with respect to the outside scene visually recognized by the user US.

In the embodiment, the operation unit 135 is formed in the control unit 10. However, a form of the operation unit 135 can be variously modified. For example, a user interface functioning as the operation unit 135 may be provided separately from the control unit 10. In this case, since the operation unit 135 is separate from the control unit 10 in which the power supply 130 and the like are formed, the operation unit 135 can be reduced in size. Operability for the user US is improved. A nine-axis sensor that detects the movement of the operation unit 135 may be formed in the operation unit 135 to perform various kinds of operation on the basis of the movement detected by the nine-axis sensor. Then, the user US can intuitively operate the head mounted display device 100.

For example, the image-light generating unit may include an organic EL (Organic Electro-Luminescence) display and an organic EL control unit. For example, in the image-light generating unit, LCOS (Liquid crystal on silicon; LCoS is a registered trademark), a digital micro mirror device, or the like can be used instead of the LCD. For example, the invention can also be applied to a head mounted display of a laser retinal projection type. In the case of the laser retinal projection type, a "region where image light can be emitted in the image-light generating unit" can be defined as an image region recognized by the eyes of the user US.

For example, the head mounted display may be a head mounted display in which the optical-image display unit covers only a part of the eyes of the user US, in other words, the optical-image display unit does not completely cover the eyes of the user US. The head mounted display may be a head mounted display of a so-called monocular type. Further, the head mounted display is not limited to the optical transmission type and may be a non-transmission type or a video transmission type through which the user US cannot visually recognize an outside scene.

FIGS. 12A and 12B are explanatory diagrams showing the external configuration of a head mounted display device in a modification. In an example shown in FIG. 12A, the head mounted display device in the modification is different from the head mounted display device 100 shown in FIG. 1 in that an image display unit 20a includes a right optical-image display unit 26a instead of the right optical-image display unit 26 and includes a left optical-image display unit 28a instead of the left optical-image display unit 28. The right optical-image display unit 26a is formed smaller than the optical member in the embodiment and is arranged obliquely above the right eye of the user US during mounting of a head mounted display device 100a. Similarly, the left optical-image display unit 28a is formed smaller than the optical member in the embodiment and is arranged obliquely above the left eye of the user US during mounting of the head mounted display device 100*a*. In an example shown in FIG. 12B, the head mounted display device in the modification is different from the head mounted display device 100 shown in FIG. 1 in that an image display unit 20*b* includes a right optical-image display unit 26*b* instead of the right optical image display unit 26 and includes a left optical-image display unit 28*b* instead of the left optical-image display unit 28. The right optical-image display unit 26*b* is formed smaller than the optical member in the embodiment and is arranged obliquely below the right eye of the user US during mounting of a head mounted display device 100*b*. The left optical-image display unit 28*b* is formed smaller than the optical member in the embodiment and is arranged obliquely below the left eye of the user US during mounting of the head mounted display device 100*b*. In this way, the optical-image display unit only has to be arranged near the eyes of the user US. The size of the optical members formed in the optical-image display unit is also arbitrary. The head mounted display device 100 can be implemented in which the optical-image display unit covers only a part of the eyes of the user US, in other words, the optical-image display unit does not completely cover the eyes of the user US.

As the earphones, an ear hook type or a headband type may be adopted. The earphones may be omitted. For example, the image display unit may be configured as a head mounted display mounted on vehicles such as an automobile and an airplane. For example, the image display unit may be configured as a head mounted display incorporated in body protective equipment such as a helmet.

The configuration of the head mounted display device 100 in the embodiment is only an example and can be variously modified. For example, one of the direction key 16 and the track pad 14 provided in the control unit 10 may be omitted. Another operation interface such as an operation stick may be provided in addition to or instead of the direction key 16 and the track pad 14. Input devices such as a keyboard and a mouse can be connected to the control unit 10. The control unit 10 may receive inputs from the keyboard and the mouse.

As the image display unit, for example, an image display unit of another type such as an image display unit worn like a cap may be adopted instead of the image display unit 20 worn like eyeglasses. The earphones 32 and 34 can be omitted as appropriate.

In the embodiment, the head mounted display device 100 may guide image light representing the same image to the left and right eyes of the user US and cause the user US to visually recognize a two-dimensional image or may guide image light representing different images to the left and right eyes of the user US and cause the user US to visually recognize a three-dimensional image.

In the embodiment, a part of the components implemented by hardware may be replaced with software. Conversely, a part of the components implemented by software may be replaced with hardware. For example, in the embodiment, the image processing unit 160 and the sound processing unit 170 are implemented by the CPU 140 reading out and executing a computer program. However, these functional units may be implemented by a hardware circuit.

When a part or all of the functions of the invention are implemented by software, the software (a computer program) can be provided while being stored in a computer-readable recording medium. In the invention, the "computer-readable recording medium" is not limited to portable recording media such as a flexible disk and a CDROM and includes various internal storage devices in the computer such as a RAM and a ROM and external storage devices fixed to the computer such as a hard disk.

In the embodiment, as shown in FIGS. 1 and 2, the control unit 10 and the image display unit 20 are formed as separate components. However, the configuration of the control unit 10 and the image display unit 20 is not limited to this and can be variously modified. For example, all the components formed in the control unit 10 may be formed or a part of the components may be formed on the inside of the image display unit 20. The power supply 130 in the embodiment may be independently formed and can be replaced. The components formed in the control unit 10 may be redundantly formed in the image forming unit 20. For example, the CPU 140 shown in FIG. 2 may be formed in both of the control unit 10 and the image display unit 20. Functions performed by the CPU 140 formed in the control unit 10 and a CPU formed in the image display unit 20 may be separated.

The control unit 10 and the image display unit 20 may be integrated to configure a wearable computer attached to clothes of the user US.

The invention is not limited to the embodiment and the modifications explained above and can be implemented in various configurations without departing from the spirit of the invention. For example, the technical features in the embodiment and the modifications corresponding to the technical features in the forms described in the summary can be replaced or combined as appropriate in order to solve a part or all of the problems or in order to attain a part or all of the effects. Unless the technical features are explained in this specification as essential technical features, the technical features can be deleted as appropriate.

REFERENCE SIGNS LIST

10 Control unit
11 Determination key
12 Lighting unit
13 Display switching key
14 Track pad
15 Luminance switching key
16 Direction key
17 Menu key
18 Power switch
20 Image display unit
21 Right holding unit
22 Right display driving unit
23 Left holding unit
24 Left display driving unit
26 Right optical-image display unit
28 Left optical-image display unit
30 Earphone plug
32 Right earphone
34 Left earphone
37 Right-eye image pickup camera (Visual-line-direction specifying unit)
38 Left-eye image pickup camera (visual-line-direction specifying unit)
40 Connecting unit
42 Right cord
44 Left cord
46 Coupling member
48 Main body cord
51, 52 Transmitting units
53, 54 Receiving units
66 Nine-axis sensor (Detecting unit)

100 Head mounted display device
110 Input-information acquiring unit
120 Storing unit
130 Power supply
135 Operation unit
140 CPU
142 State determining unit (Image-position setting unit, Detecting unit)
145 Visual-line-direction specifying unit (Visual-line-direction specifying unit)
150 Operating system
160 Image processing unit (Image-position setting unit)
170 Sound processing unit
180 Interface
190 Display control unit
201 Right backlight control unit (Image-light generating unit)
202 Left backlight control unit (Image-light generating unit)
211 Right LCD control unit (Image-light generating unit)
212 Left LCD control unit (Image-light generating unit)
221 Right backlight (Image-light generating unit)
222 Left backlight (Image-light generating unit)
241 Right LCD (Image-light generating unit)
242 Left LCD (Image-light generating unit)
251 Right projection optical system
252 Left projection optical system
261 Right light guide plate
262 Left light guide plate
VSync Vertical synchronization signal
HSync Horizontal synchronization signal
PCLK Clock signal
theta-1, theta-2, theta-h, theta-c Angles
OA External apparatus
ED Visual line direction
RE Right eye
LE Left eye
PG, PG1, PG2 Gazing points
IL Illumination light
PL Image light
OL Horizontal axis
EL, ER Ends
IM Display image
AP Distal end portion
GR Ground
US User
ES Track
PGL Track
HFP Head base point

What is claimed is:

1. A head mounted display device comprising:
an image display configured to display image light generated on the basis of image data, the image display causing, in a state in which the image display unit is worn on a head of a user, the user to visually recognize the image light as a virtual image and transmitting an outside scene;
a sensor configured to detect a movement of the head of the user; and
a processor that is configured to change, on the basis of a cyclical change in a position of the head of the user predicted on the basis of the detected movement of the head, a position of the image light in a region where the image light can be generated, the cyclical change in the position of the head of the user being a repeated series of substantially identical motions of the user's head.

2. The head mounted display device according to claim 1, wherein the processor is further configured to specify a visual line direction of the user, and
the changing of the position of the image light is additionally on the basis of a cyclical change in the specified visual line direction.

3. The head mounted display device according to claim 1, wherein the processor is further configured to specify a visual line direction of the user, and
the changing of the position of the image light is additionally on the basis of a head base point separated by a predetermined distance from an eye of the user serving as a base point of the cyclical change in the position of the head and a gazing point of the user specified on the basis of the visual line direction.

4. The head mounted display device according to claim 3, wherein the changing of the position of the image light is in a direction same as the direction of the predicted change in the position of the head when a gazing point distance from the eye of the user to the gazing point is smaller than the predetermined distance and changes the position of the image light in a direction opposite to the direction of the predicted change in the position of the head when the gazing point distance is larger than the predetermined distance.

5. The head mounted display device according to claim 1, wherein
the display includes a plurality of pixels, and
the processor changes the position of the image light by changing a position of a pixel where the image light is generated in the display.

6. A control method for a head mounted display device including an image display configured to display image light generated on the basis of image data, the image display causing, in a state in which the image display unit is worn on a head of a user, the user to visually recognize the image light as a virtual image and transmitting an outside scene, the control method comprising:
detecting a movement of the head of the user; and
changing, on the basis of a cyclical change in a position of the head of the user predicted on the basis of the detected movement of the head, a position of the image light in a region where the image light can be generated, the cyclical change in the position of the head of the user being a repeated series of substantially identical motions of the user's head.

7. The control method of claim 6, wherein the cyclical change in the position of the head of the user causes the user's head to follow a sinusoidal path.

8. The control method according to claim 6, wherein the cyclical change in the position of the head is caused by a walking or running motion of the user.

9. The head mounted display device according to claim 1, wherein the cyclical change in the position of the head of the user causes the user's head to follow a sinusoidal path.

10. The head mounted display device according to claim 1, wherein the cyclical change in the position of the head of the user is caused by a walking or running motion of the user.

* * * * *